US012085659B2

(12) United States Patent
Ganu et al.

(10) Patent No.: US 12,085,659 B2
(45) Date of Patent: Sep. 10, 2024

(54) RANGING BY A NETWORK DEVICE DURING A BEACON INTERVAL

(71) Applicant: HEWLETT PACKARD ENTERPRISE DEVELOPMENT LP, Houston, TX (US)

(72) Inventors: Sachin Ganu, Santa Clara, CA (US); Omar El Ferkouss, St. Laurent (CA); Vikram Raghu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 244 days.

(21) Appl. No.: 17/541,872

(22) Filed: Dec. 3, 2021

(65) Prior Publication Data
US 2023/0176164 A1   Jun. 8, 2023

(51) Int. Cl.
*H04W 8/00* (2009.01)
*G01S 5/00* (2006.01)
*H04W 24/10* (2009.01)
*H04W 64/00* (2009.01)
*H04W 84/12* (2009.01)

(52) U.S. Cl.
CPC .......... *G01S 5/0063* (2013.01); *G01S 5/0081* (2013.01); *H04W 8/005* (2013.01); *H04W 24/10* (2013.01); *H04W 64/003* (2013.01); *H04W 84/12* (2013.01)

(58) Field of Classification Search
CPC ... H04W 8/005; H04W 24/10; H04W 64/003; G01S 5/0063; G01S 5/0081
USPC ...................................... 455/456.1
See application file for complete search history.

(56) References Cited

U.S. PATENT DOCUMENTS

| 9,220,081 | B2 | 12/2015 | Prechner et al. |
| 9,949,156 | B2 | 4/2018 | Patil et al. |
| 10,034,188 | B2 | 7/2018 | Ben-Haim et al. |
| 10,187,817 | B2 | 1/2019 | Sanderovich et al. |
| 10,375,623 | B2 | 8/2019 | Bajko et al. |
| 10,477,349 | B2 | 8/2019 | Sinha et al. |
| 11,283,420 | B1* | 3/2022 | Silverman ............... H04B 1/109 |
| 2006/0099950 | A1* | 5/2006 | Klein ..................... H04W 36/14 455/439 |
| 2007/0140163 | A1* | 6/2007 | Meier .................... H04W 8/005 370/329 |
| 2010/0330957 | A1* | 12/2010 | Harada .................. H04M 15/51 455/406 |
| 2017/0135019 | A1* | 5/2017 | Vamaraju .............. H04W 36/30 |
| 2018/0227714 | A1 | 8/2018 | Lee et al. |

(Continued)

*Primary Examiner* — Joel Ajayi
(74) *Attorney, Agent, or Firm* — Hewlett Packard Enterprise Patent Department

(57) ABSTRACT

Examples described herein provide ranging by a network device during a beacon interval. Examples described herein may discover, by a network device during a first beacon interval, a plurality of APs in a network that are capable of ranging and a received signal measurement of each of the plurality of APs. Examples described herein may select, by the network device, an AP with a strongest received signal measurement among the plurality of APs, determine, by the network device, whether the selected AP is available for ranging, and based on a determination that the selected AP is available for ranging, initiate, by the network device during a second beacon interval, ranging measurements with the selected AP to generate a ranging result. Examples described herein may, based on the ranging result, resolve locations of the plurality of APs.

20 Claims, 8 Drawing Sheets

(56) References Cited

U.S. PATENT DOCUMENTS

| | | |
|---|---|---|
| 2018/0249437 A1 | 8/2018 | Lindskog et al. |
| 2019/0271774 A1 | 9/2019 | Zhang et al. |
| 2019/0306825 A1 | 10/2019 | Lindskog et al. |
| 2020/0389343 A1 | 12/2020 | Zhang |
| 2021/0051624 A1 | 2/2021 | Koshy et al. |
| 2022/0338141 A1* | 10/2022 | Singh .................. H04W 72/51 |

* cited by examiner

RANGING BY A NETWORK DEVICE DURING A BEACON INTERVAL

CROSS-REFERENCE TO RELATED APPLICATIONS

This application is related to U.S. patent application Ser. No. 17/541,909, filed on Dec. 3, 2021, the contents of which are incorporated herein by reference in their entirety.

BACKGROUND

Generally, in a Wireless Local Area Network (WLAN), one or more Access Points (APs) may be deployed. Communication devices such as laptops, personal computers, smartphones, etc. may connect to the WLAN to exchange data within the network. The communication devices can raise ranging requests with the one or more APs.

Ranging techniques such as the Fine Timing Measurement (FTM) protocol have attained prominence due to wide compatibility between the APs and the communication devices. The FTM protocol, typically, comprises exchange of messages between the APs and the communication devices. From the messages, a time of flight, a round trip time, etc. is derived, which is used for determining a position of the communication device with reference to the AP. For example, the time of flight can be defined as the overall time taken by signals to propagate from the AP to a client device (say, the communication device), and back to the AP from the client device. From the time of flight information, a distance between the AP and the client device may be determined.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
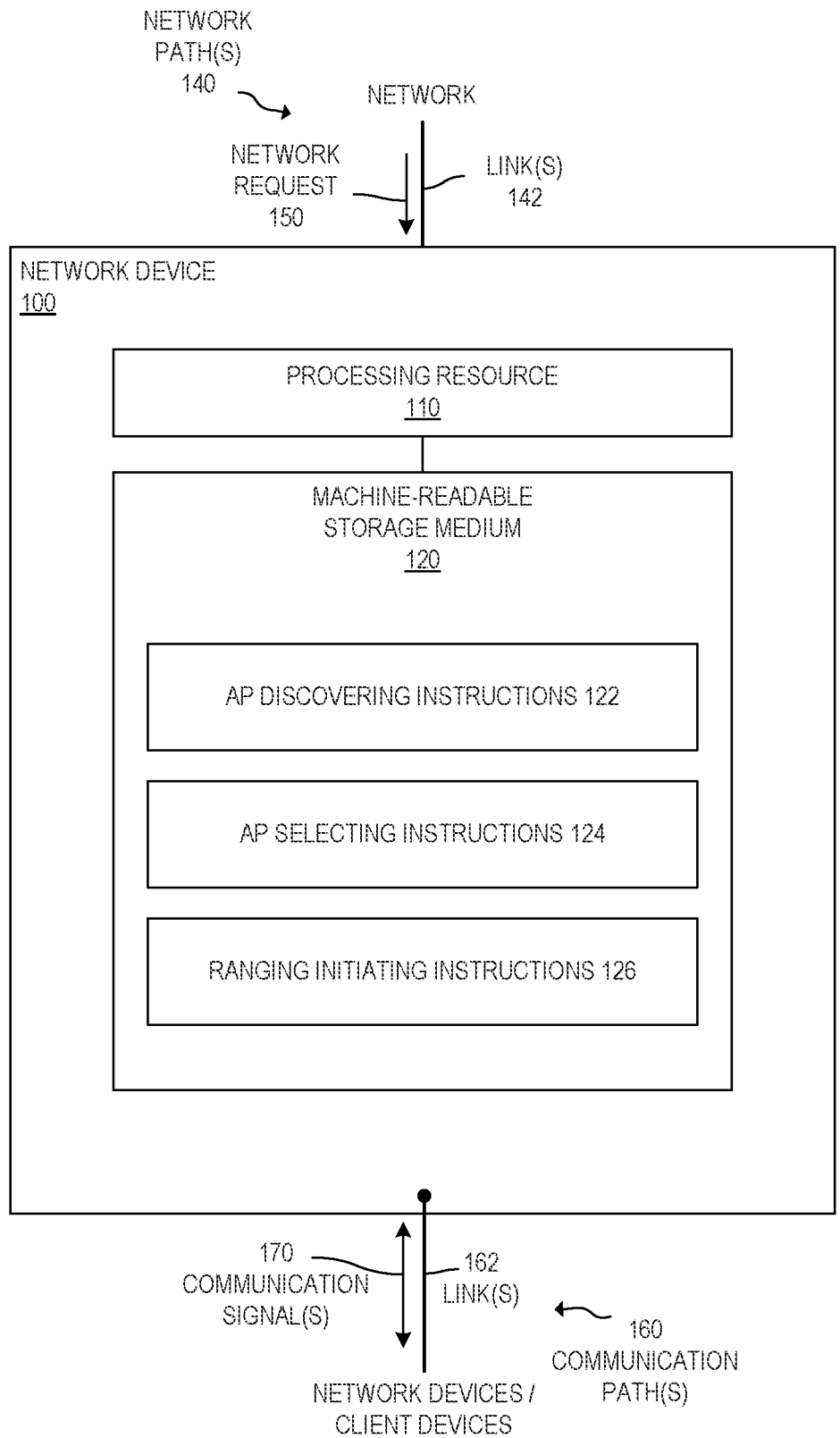
FIG. 1 is a block diagram of an example network device for providing ranging between APs in a network during a beacon interval.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Recently, there have been efforts to automatically locate APs in a network, for instance, on a visual floor plan of the network. Such automatic location of APs is advantageous over the manual location of APs, as the manual location of APs can be an error-prone process. For instance, when manually locating APs in a network, an AP's location may be incorrectly measured or entered, or an AP may be moved or removed from service.

To support the automatic location of APs, the APs need to perform packet exchanges with neighboring APs, and then measure the round trip time (RTT) of these packet exchanges to estimate the range of the APs to their corresponding neighbor APs. Performing ranging sequentially between individual pairs of APs may result in increased airtime overhead since a large amount of available airtime is used to complete the ranging measurements between the APs. Moreover, ranging techniques typically do not allow APs to continue performing ranging when there are changes to a network's topology (e.g., when APs are added to the network or removed from service) without causing disruptions to communications between the APs and client devices that are connected to the APs. Thus, there is a need for efficient ranging between APs in a network which minimizes airtime overhead and disruptions to communications between the APs and client devices when there are changes to the network topology.

To address these issues, examples described herein provide ranging by a network device during a beacon interval. Examples described herein may discover, by a network device during a first beacon interval, a plurality of APs in a network that are capable of ranging and a received signal measurement of each of the plurality of APs. Examples described herein may select, by the network device, an AP with a strongest received signal measurement among the plurality of APs, determine, by the network device, whether the selected AP is available for ranging, and based on a determination that the selected AP is available for ranging, initiate, by the network device during a second beacon interval, ranging measurements with the selected AP to generate a ranging result. Examples described herein may, based on the ranging result, resolve locations of the plurality of APs.

In this manner, examples described herein provide ranging by a network device during a beacon interval, which reduces airtime overhead for peforming ranging and minimizes disruptions to communications between the network device and client devices when there are changes to the network topology. For instance, examples described herein may discover, by the network device during a first beacon interval, a plurality of APs in a network that are capable of ranging and a received signal measurement of each of the plurality of APs, thereby enabling the network device to discover the plurality of APs during a time (the first beacon interval) when the network device does not communicate with a plurality of client devices (e.g., when the network device is not transmitting a plurality of beacons to the client devices.) Moreover, examples described herein may initiate, by the network device during a second beacon interval, ranging measurements with the selected AP having a strongest received signal measurement among the plurality of APs to generate a ranging result, thereby enabling ranging between the network device and the selected AP during a time (the second beacon interval) when the network device does not communicate with a plurality of client devices. Moreover, in such examples, the network device initiates ranging with the selected AP having the strongest received signal measurement among the plurality of APs, thereby increasing the likelihood of generating a high quality ranging result and improving the reliability (e.g., accuracy) of resolving locations of the plurality of APs based on the ranging result.

Network Device

Referring now to the drawings, FIG. 1 depicts a block diagram of an example network device 100 for providing ranging during a beacon interval. Network device 100 includes at least one processing resource 110 and at least one machine-readable storage medium 120 comprising (e.g., encoded with) at least AP discovering instructions 122, AP selecting instructions 124, and ranging initiating instructions 126.

In the example of FIG. 1, network device 100 may engage in any network data transmission operations, including, but not limited to, switching, routing, bridging, or a combination thereof. In addition, network device 100 may comprise a wireless AP (WAP). In examples described herein, a "WAP" generally refers to receiving points for any known or convenient wireless access technology which may later become known. Specifically, the term WAP is not intended to be limited to WAPs which conform to the Institute of Electrical and Electronics Engineers (IEEE) 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood that network device 100 may include any suitable type of network device made by any suitable manufacturer(s).

In the example of FIG. 1, network device 100 includes at least one radio (not shown) to communicate with one or more client devices (e.g., communication devices), one or more other network devices (e.g., APs), one or more computing devices, or a combination thereof. The radio(s) may generate a signal in one or more frequency bands, process a signal in one or more frequency bands, or a combination thereof. The radio(s) of network device 100 may operate at any suitable frequency band(s) and conform to any suitable type(s) of wireless communication standards, now known or later developed. For instance, one or more radios of network device 100 may operate at one or more channels in the 2.4 GHz band and/or 5 GHz band, in accordance with the IEEE 802.11ac and/or 802.11ax standards. Moreover, network device 100 may include one, two, or any other suitable number of radios.

In the example of FIG. 1, network device 100 may be configured (e.g., encoded with instructions executable by at least one processing resource 110) to receive network request(s) 150 from a network via network path(s) 140. Network path(s) 140 may include any suitable link(s) 142 (e.g., wired or wireless, direct or indirect, etc.) between network device 100 and a network. Network request(s) 150 may include any suitable instructions to instruct network device 100 to perform ranging during a beacon interval. For instance, network request(s) 150 may include instructions to instruct network device 100 to perform AP discovering instructions 122, AP selecting instructions 124, and ranging initiating instructions 126.

In examples described herein, a "network path" may include a combination of hardware (e.g., interfaces, links, etc.) and instructions (e.g., executable by a processing resource) to communicate (e.g., receive, send) a command (e.g., network request 150) to an external resource (e.g., computing device, server, cloud computing resource, etc.) connected to the network.

In the example of FIG. 1, network device 100 may be configured (e.g., encoded with instructions executable by at least one processing resource 110) to send or receive communication signal(s) 170 via communication path(s) 160 to perform ranging during a beacon interval. Communication path(s) 160 may include any suitable link(s) 162 (e.g., wired or wireless, direct or indirect, etc.) between network device 100 and one or more other network devices (e.g., APs), one or more client devices (e.g., communication devices), or a combination thereof. Communication signal(s) 170 may include any suitable instructions for network device 100 to perform ranging during a beacon interval (e.g., to perform AP discovering instructions 122, AP selecting instructions 124, and ranging initiating instructions 126).

In examples described herein, a "communication path" may include a combination of hardware (e.g., interfaces, links, etc.) and instructions (e.g., executable by a processing resource) to communicate (e.g., receive, send) a command with one or more network devices, one or more client devices, or a combination thereof.

In the example of FIG. 1, network device 100 may communicate with one or more other network devices (e.g., APs) and/or one or more client devices (e.g., communication devices) that are connected to network device 100 (e.g., via links 162). For instance, one or more communication devices such as a laptop computer, a desktop computer, a mobile device, and/or other wireless devices, etc., may connect to network device 100. In examples described herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices. Network device 100 may communicate with one or more other network devices and/or one or more client devices via a radio.

In the example of FIG. 1, network device 100 may communicate with one or more computing devices that are connected to network device 100 (e.g., via links 142). For instance, one or more computing devices such as a gateway router, a wireless local area network (WLAN) controller, a switch, a server, etc., may connect to network device 100. Network device 100 may communicate with one or more computing devices via a radio.

Ranging During a Beacon Interval

Figure 4:
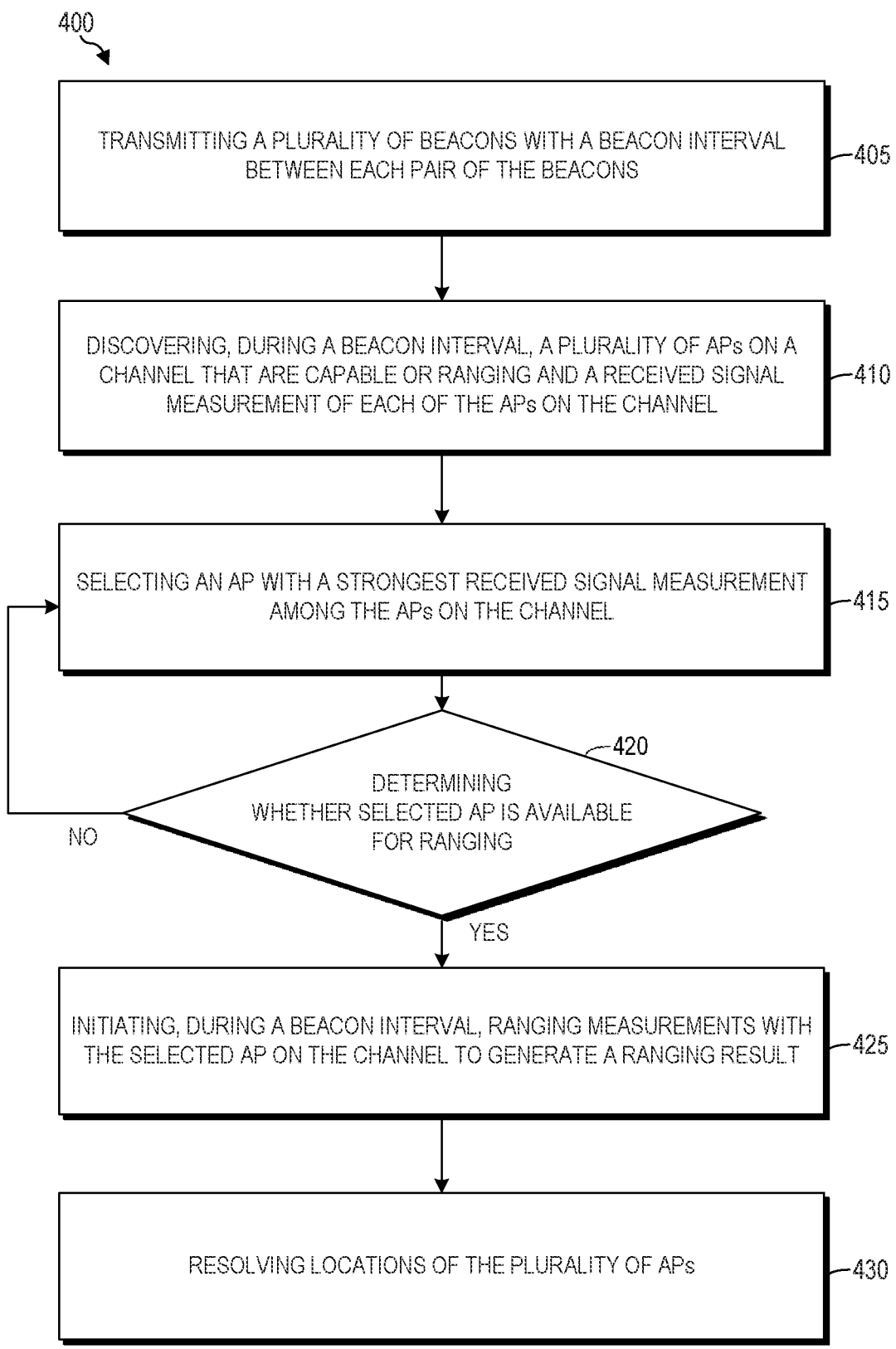
FIG. 4 is a flowchart of an example method for providing ranging between APs in a network during a beacon interval.

Referring to FIG. 4, a flowchart depicting a method 400 for ranging by a network device during a beacon interval is presented in some examples. Although the execution of method 400 is described below with reference to network device 100 of FIG. 1, any suitable network device for the execution of method 400 may be utilized. Additionally, the implementation of method 400 is not limited to such examples. While method blocks 405 to 430 are shown in method 400, method 400 may include other actions described herein. Additionally, although the blocks are shown in an order, blocks depicted in FIG. 4 may be performed in any suitable order and at any time. Moreover, one or more of blocks of method 400 may be performed in combination with one or more blocks of methods 500, 600, and 700. Also, some of the blocks shown in method 400 may be omitted without departing from the spirit and scope of this disclosure.

At block 405, method 400 may include transmitting a plurality of beacons with a beacon interval between each pair of the plurality of beacons. Referring to network device 100 of FIG. 1, network device 100 may comprise instructions, when executed by processing resource 110, to transmit a plurality of beacons with a beacon interval between each pair of the plurality of beacons.

As used herein, a "beacon" (i.e., a beacon frame) refers to a management frame transmitted by a network device (e.g., network device 100) which contains information about a network that is needed by a station (e.g., client device, another network device, etc.) to communicate with the network device (e.g., transmit a frame) in the network. A beacon may have a frame format in accordance with the IEEE 802.11 standards. For instance, a beacon may comprise an IEEE 802.11 media access control (MAC) header, a body, and a frame check sequence (FCS). The body of the beacon may comprise a timestamp, a beacon interval, a type field that indicates information about the capabilities of the network (e.g., whether the network is infrastructure-based or ad hoc), service set identifiers (SSIDs), supported transmission rates, a frequency-hopping (FH) parameter set, a direct-sequence (DS) parameter set, a contention-free (CF) parameter set, a time indication map (TIM), or a combination thereof. It will be understood that a beacon may have any suitable format in accordance with any suitable standard(s).

As used herein, a "beacon interval" (also known as a "Target Beacon Transmission Time") refers to a frequency of beacon transmissions by a network device (e.g., network device 100). That is, a beacon interval refers to a duration of time between successive beacon transmissions (i.e., beacon broadcasts) by a network device. The beacon interval may correspond to an off-channel dwell period, i.e., a period of time in which a network device does not communicate with one or more stations (e.g., client devices) on a given channel. A beacon interval may be measured in time units, wherein a time unit corresponds to 1.024 milliseconds. It will be understood that a beacon interval may be set to 100 time units, 300 time units, or any suitable duration of time.

Network device 100 may transmit the plurality of beacons with a same beacon interval between two or more pairs of the plurality of beacons. For example, network device 100 may transmit a first pair of beacons with a first beacon interval between the first pair of beacons, and transmit a second pair of beacons with a second beacon interval between the second pair of beacons, wherein the first beacon interval is the same duration of time as the second beacon interval. Moreover, network device 100 may transmit the plurality of beacons with a different beacon interval between two or more pairs of the plurality of beacons. For example, network device 100 may transmit a first pair of beacons with a first beacon interval between the first pair of beacons, and transmit a second pair of beacons with a second beacon interval between the second pair of beacons, wherein the first beacon interval is a different duration of time (e.g., shorter, longer) than the second beacon interval.

Network device 100 may transmit the plurality of beacons to one or more stations (e.g., client devices) in a network, to establish communications (e.g., via links 162) with the one or more stations in the network. Network device 100 may transmit the plurality of beacons to the one or more stations on one or more channels (e.g., first channel, second channel, etc.) of the network.

At block 410, method 400 may include discovering, during a beacon interval (e.g., first beacon interval), a plurality of APs on a channel (e.g., first channel) that are capable of ranging and a received signal measurement of each of the plurality of APs on the channel. Referring to network device 100 of FIG. 1, network device 100 may comprise AP discovering instructions 122, when executed by processing resource 110, to discover, during a beacon interval, a plurality of APs on a channel that are capable of ranging and a received signal measurement of each of the plurality of APs on the channel.

Discovering the plurality of APs on the channel may comprise scanning, by network device 100 during the beacon interval, the channel, and receiving, by network device 100, a plurality of beacons from the plurality of APs on the channel, wherein the plurality of beacons indicate that the plurality of APs are capable of ranging. It will be understood that the plurality of beacons received by network device 100 from the plurality of APs on the channel may have any suitable format.

The received signal measurement of each of the plurality of APs on a channel may comprise a received signal strength indicator (RSSI), a signal to noise ratio (SNR), or a combination thereof. The plurality of beacons received by network device 100 from the plurality of APs on a channel may indicate the received signal measurement of each of the plurality of APs on the channel. It will be understood that the received signal measurement of each of the plurality of APs on a channel may be received by network device 100 in any suitable format.

Furthermore, at block 410, method 400 may include, for each of a plurality of channels, discovering, during a beacon interval, a plurality of APs on the channel that are capable of ranging and a received signal measurement of each of the plurality of APs on the channel. For example, network device 100 may discover, during a first beacon interval, a first subset of APs on a first channel that are capable of ranging and a received signal measurement of each of the first subset of APs on the first channel, and discover, during a subsequent beacon interval (e.g., second beacon interval), a second subset of APs on a second channel that are capable of ranging and a received signal measurement of each of the second subset of APs on the second channel. It will be understood that network device 100 may discover APs on one, two, ten, or any suitable number of channels.

At block 415, method 400 may include selecting an AP with a strongest received signal measurement among the plurality of APs on the channel. Referring to network device 100 of FIG. 1, network device 100 may comprise AP selecting instructions 124, when executed by processing resource 110, to select an AP with a strongest received signal measurement among the plurality of APs on the channel.

In some examples, network device 100 may select an AP with the strongest received signal measurement among the plurality of APs on a same channel as the channel on which network device 100 transmits the plurality of beacons (at block 405.) Alternatively, network device 100 may select an AP with the strongest received signal measurement among the plurality of APs on a different channel than the channel on which network device 100 transmits the plurality of beacons (at block 405.) For example, network device 100 may transmit, on a first channel, a plurality of beacons with a beacon interval between each pair of the plurality of beacons (at block 405), and then discover a plurality of APs on a second channel that are capable of ranging and a received signal measurement of each of the plurality of APs on the second channel (at block 410), and then select an AP on the second channel with the strongest received signal measurement among a plurality of APs on the second channel (at block 415), wherein the first channel is different from the second channel. It will be understood that each channel (e.g., first channel, second channel) of a network may correspond to any suitable frequency band(s) in accordance with any suitable standard(s) (e.g., IEEE 802.11.)

Furthermore, at block 415, method 400 may include selecting a channel among a plurality of channels of the network, and then selecting the AP with the strongest received signal measurement among a plurality of APs on the selected channel of the network. In some examples, network device 100 may randomly select the channel among the plurality of channels. In other examples, network device 100 may select the channel among the plurality of channels based on a predetermined order for selecting the plurality of channels. The predetermined order may be set by a device (e.g., network device 100) or by a user.

Selecting the AP with the strongest received signal measurement among a plurality of APs on a channel may comprise sorting, by network device 100, basic service set identifiers (BSSIDs) of the plurality of APs on the channel based on the received signal strength of each of the plurality of APs on the channel, and selecting, by network device 100, the BSSID of the AP with the strongest received signal measurement on the channel. For example, network device 100 may sort the BSSIDs of the plurality of APs on a first channel in a list in ascending order of the received signal strength measurements of the plurality of APs on the first channel, such that the BSSID of the AP with the strongest received signal measurement on the first channel is listed first on the list of BSSIDs. In such example, network device 100 may select the first listed BSSID on the list of BSSIDs (at block 415). The plurality of beacons received by network device 100 from the plurality of APs may indicate the BSSID of each of the plurality of APs. It will be understood that the BSSID of each of the plurality of APs may be received by network device 100 in any suitable format.

Selecting an AP with a strongest received signal measurement among a plurality of APs on a channel may comprise, selecting, by network device 100, an AP among a plurality of APs on the channel for which ranging has not yet been performed That is, at block 415, the selected AP among the plurality of APs on a channel may be an AP for which network device 100 has not yet initiated ranging measurements between network device 100 and the selected AP to generate a ranging result (as described below in relation to block 425 of method 400).'

At block 420, method 400 may include determining whether the selected AP is available for ranging. Referring to network device 100 of FIG. 1, network device 100 may comprise instructions, when executed by processing resource 110, to determine whether the selected AP is available for ranging. At block 420, if it is determined that the selected AP is not available for ranging, then method 400 returns to block 415, to select an AP with a strongest received signal measurement among the plurality of APs on a channel. In such instance, method 400 may return to block 415 after a predetermined time period (e.g., 100 milliseconds, 1 second, etc.) has elapsed. When method 400 returns to block 415, method 400 may include selecting an AP with a strongest received signal measurement among a plurality of APs on a same or different channel than the channel when block 415 was previously performed. For instance, network device 100 may select an AP with a strongest received signal measurement among a first subset of APs on a first channel (at block 415), and based on a determination that the selected AP on the first channel is not available for ranging (at block 420), may then select an AP with a strongest received signal measurement among a second subset of APs on a second channel (when method 400 returns to block 415). At block 420, if it is determined that the selected AP is available for ranging, then method 400 proceeds to block 425.

At block 425, method 400 may include initiating, during a beacon interval (e.g., a second beacon interval), ranging measurements with the selected AP on the channel to generate a ranging result. Referring to network device 100 of FIG. 1, network device 100 may comprise ranging initiating instructions 126, when executed by processing resource 110, to initiate, during a second beacon interval, ranging measurements with the selected AP on the channel to generate a ranging result.

The ranging measurements with the selected AP (i.e., ranging measurements between network device 100 and the selected AP) on the channel may include a FTM, a RTT measurement, a time of arrival (ToA) measurement, a Time of Flight (ToF) measurement, an Angle of Arrival (AoA) measurement, an RSSI measurement, a short guard interval (SGI) measurement, a long guard interval (LGI) measurement, channel state information (CSI), or a combination thereof, between network device 100 and the selected AP. It will be understood that the ranging measurements between network device 100 and the selected AP may have any suitable format. Moreover, the ranging result generated by network device 100 may indicate the ranging measurements between network device 100 and the selected AP on the channel, and may be transmitted to another device (e.g., a computing device, another network device, etc.) For instance, the ranging result may be indicated by (e.g., included in) one or more data packets which are received by a computing device. It will be understood that the ranging result generated by network device 100 may have any suitable format.

As used herein, an RTT (also known as a round trip delay or ping time) corresponds to a period of time for a signal (e.g., a data packet) to travel across a network from a starting point (e.g., a first network device) to a destination point (e.g., a second network device) and for an acknowledgement of that signal to be returned to the starting point. An RTT measurement may be based on propagation delay, processing delay, queuing delay, encoding delay, or a combination thereof. It will be understood that an RTT may be computed based on any suitable techniques in accordance with any suitable protocol(s) (e.g., Transmission Control Protocol).

As used herein, CSI refers to known channel properties of a wireless signal between a transmitter and a receiver (e.g., between a first AP and a second AP.) CSI is used to determine how a wireless signal propagates between the transmitter and the receiver and represents the combined effect, for example, of scattering, fading, and power decay of the transmitted wireless signal with distance.

Initiating the ranging measurements with the selected AP on the channel may include, configuring, by network device 100, a channel bandwidth in the channel for the ranging measurements. For instance, network device 100 may configure a channel bandwidth of 80 MHz in the channel for the ranging measurements with the selected AP. It will be understood that network device 100 may configure a channel bandwidth of 20 MHz, 40 MHz, 80 MHz, 160 MHz, or any suitable channel bandwidth in the channel, for the ranging measurements with the selected AP. In addition, initiating the ranging measurements with the selected AP on the channel may comprise configuring, by network device 100, an antenna chain between network device 100 and the selected AP for the ranging measurements with the selected AP. Configuring an antenna chain between network device 100 and the selected AP may comprise selecting, by network device 100, an antenna of network device 100 (among one or more antennas of network device 100) for the ranging measurements with the selected AP, and selecting, by network device 100, an antenna of the selected AP (among one or more antennas of the selected AP) for the ranging measurements with the selected AP. Moreover, initiating the ranging measurements with the selected AP on the channel may comprise configuring, by network device 100, a transmission effective isotropic radiated power (EIRP) for the ranging measurements with the selected AP. For instance, network device 100 may configure a transmission EIRP to be 100% of the available power (i.e., Pmax) for network device 100 to perform the ranging measurements with the selected AP. It will be understood that network device 100 may configure the transmission EIRP to be 100% (Pmax), 90%, 75%, or any other suitable percentage of the available power for network device 100 to perform ranging measurements with the selected AP.

The ranging measurements with the selected AP on the channel may be initiated during a subsequent beacon interval (e.g., second beacon interval) as the beacon interval (e.g., the first beacon interval) during which network device 100 discovers the plurality of APs (at block 410.)

At block 430, method 400 may include, based on the ranging result, resolving locations of the plurality of APs. Referring to FIG. 1, a computing device (not shown) that is in communication with network device 100 (e.g., via links 142) may comprise instructions, when executed by a processing resource, to resolve the locations of the plurality of APs based on the ranging result (e.g., based on receiving the ranging result.) In such example, resolving the locations of the plurality of APs may include transmitting, by network device 100, the ranging result to a computing device, wherein the computing device resolves the locations of the plurality of APs based on the ranging result. Alternatively, network device 100 may comprise instructions, when executed by processing resource 100, to resolve the locations of the plurality of APs.

Resolving the locations of the plurality of APs may be based on multiple ranging results for APs on different channels. For example, network device 100 may discover, during a first beacon interval, a first subset of APs on a first channel that are capable of ranging and a received signal measurement of each of the first subset of APs on the first channel (at block 410), select a first AP with a strongest received signal measurement among the first subset of APs on the first channel (at block 415), determine that the selected first AP on the first channel is available for ranging (at block 420), and initiate, during a second beacon interval, ranging measurements with the selected first AP on the first channel to generate a first ranging result (at block 425.) In addition, in such example, network device 100 may discover, during a third beacon interval, a second subset of APs on a second channel that are capable of ranging and a received signal measurement of each of the second subset of APs on the second channel (at block 410), select a second AP with a strongest received signal measurement among the second subset of APs on the second channel (at block 415), determine that the selected second AP on the second channel is available for ranging (at block 420), and initiate, during a fourth beacon interval, ranging measurements with the selected second AP on the second channel to generate a second ranging result (at block 425.) Then, in such example, a computing device may, based on the first ranging result and the second ranging result, resolve the locations of a plurality of APs including the first subset of APs and the second subset of APs (at block 430.)

Resolving locations of a plurality of APs may include estimating the locations (e.g., coordinates) of the plurality of APs on an AP map (e.g., a map of relative AP locations on a visual floor plan) based on the ranging results. Techniques for resolving the locations of the APs based on ranging results (e.g., FTMs) are described further in the following patent applications, which are hereby incorporated by reference.

U.S. application Ser. No. 16/831,213, filed Mar. 26, 2020, in the name of the inventors Vikram Raghu, Eldad Perahia, Sachin Ganu, Sai Pradeep Venkatraman, and Chuck Lukaszewski, and entitled "AUTOMATIC LOCATION OF ACCESS POINTS IN A NETWORK", which is commonly assigned herein.

U.S. application Ser. No. 17/218,309, filed Mar. 31, 2021, in the name of the inventors Amogh Guruprasad Deshmukh, Eldad Perahia, Gaurav Patwardhan, and Sachin Ganu, and entitled "HANDLING FINE TIMING MEASUREMENT REQUESTS", which is commonly assigned herein.

U.S. application Ser. No. 17/229,954, filed Apr. 14, 2021, in the name of the inventors Omar El Ferkouss, Andre Beaudin, and Sachin Ganu, and entitled "FINE TIMING MEASUREMENTS IN ENTERPRISE DEPLOYMENTS USING HIGH BANDWIDTH CHANNELS", which is commonly assigned herein.

U.S. application Ser. No. 17/337,679, filed Jun. 3, 2021, in the name of the inventors Sachin Ganu, Chuck Lukaszewski, Gaurav Patwardhan, Eldad Perahia, Vikram Raghu, and Stuart Wal Strickland, and entitled "AUTOMATIC LOCATION OF ACCESS POINTS IN A NETWORK", which is commonly assigned herein.

In the event of conflict between the incorporated applications and the present disclosure, the present specification, including definitions, controls.

In this manner, example network device 100 provides ranging during a beacon interval, which reduces airtime overhead for performing ranging and minimizes disruptions to communications between network device 100 and client devices when there are changes to the network topology. For instance, network device 100 may discover, during a beacon interval (e.g., first beacon interval), a plurality of APs in a network that are capable of ranging and a received signal measurement of each of the plurality of APs, thereby enabling network device 100 to discover the plurality of APs during a time (during the first beacon interval) when network device 100 does not communicate with a plurality of client devices (e.g., when network device 100 is not transmitting a plurality of beacons to the client devices.) Moreover, network device 100 may initiate, during a beacon interval (e.g., second beacon interval), ranging measurements with the selected AP having a strongest received signal measurement among the plurality of APs to generate a ranging result, thereby enabling ranging between network device 100 and the selected AP during a time (during the second beacon interval) when network device 100 does not communicate with a plurality of client devices. Moreover, in such examples, network device 100 initiates ranging with the selected AP having the strongest received signal measurement among the plurality of APs, thereby increasing the likelihood of generating a high quality ranging result and improving the reliability (e.g., accuracy) of resolving locations of the plurality of APs based on the ranging result.

Figure 5:
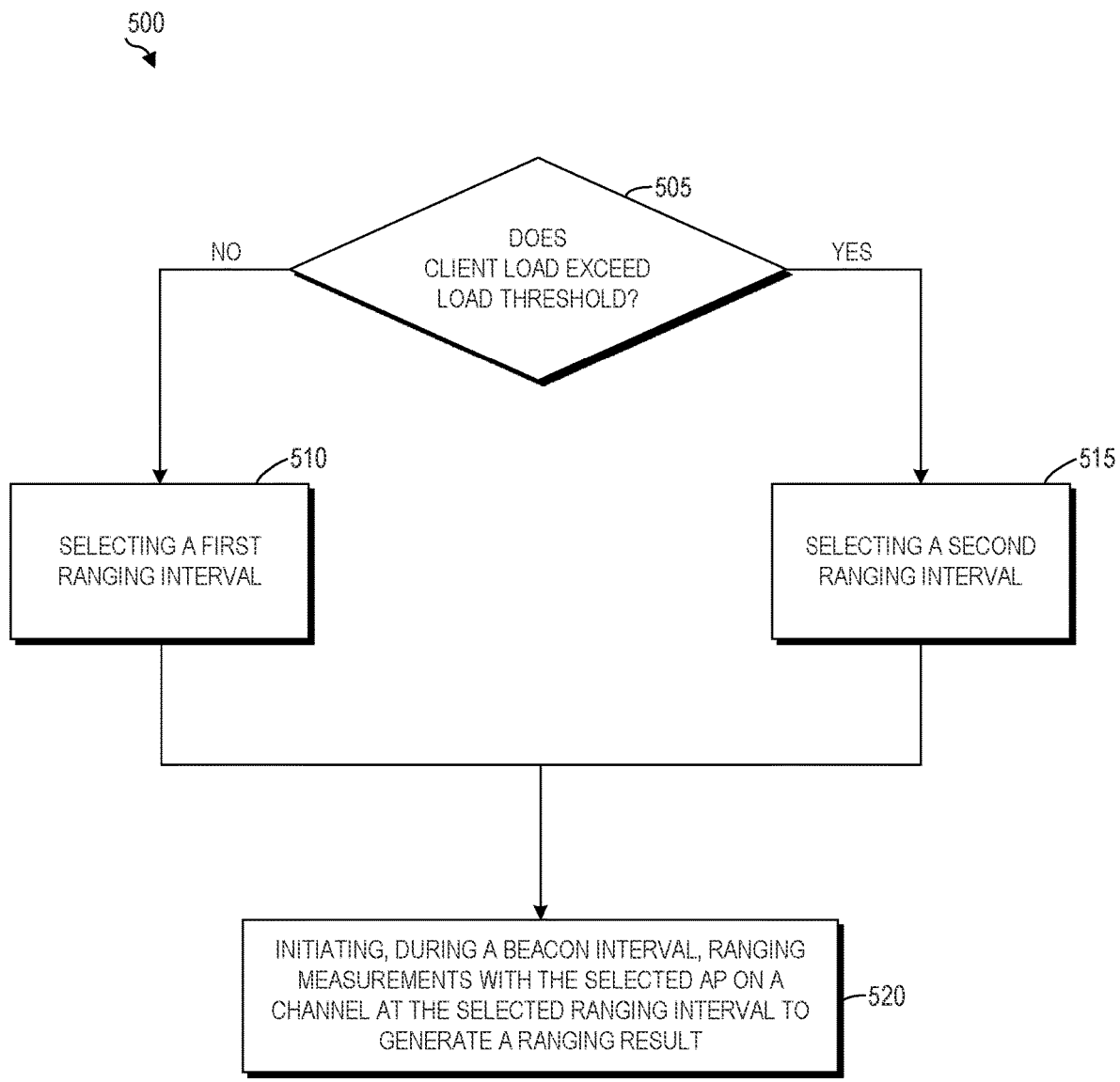
FIG. 5 is a flowchart of an example method for providing ranging between APs in a network during a beacon interval.

Referring to FIG. 5, a flowchart depicting a method 500 for ranging by a network device during a beacon interval is presented in some examples. Although the execution of method 500 is described below with reference to network device 100 of FIG. 1, any suitable network device for the execution of method 500 may be utilized. Additionally, the implementation of method 500 is not limited to such examples. While method blocks 505 to 520 are shown in method 500, method 500 may include other actions described herein. Additionally, although the blocks are shown in an order, blocks depicted in FIG. 5 may be performed in any suitable order and at any time. Moreover, one or more of blocks of method 500 may be performed in combination with one or more blocks of methods 400, 600, and 700. Also, some of the blocks shown in method 500 may be omitted without departing from the spirit and scope of this disclosure.

At block 505, method 500 may include determining whether a client load on network device 100 exceeds a load threshold. At block 505, if it is determined that the client load does not exceed the load threshold, then method 500 proceeds to block 510. Conversely, at block 505, if it is determined that the client load exceeds the load threshold, then method 500 proceeds to block 515.

The load threshold may correspond a threshold amount of network traffic between network device 100 and one or more client devices, one or more other network devices (e.g., APs), one or more other stations, or a combination thereof. The load threshold may be computed by network device 100 or may be a predetermined value (e.g., based on the capabilities of network device 100, based on a user input, etc.) The load threshold may be determined based on the number of client devices that are in communication with (e.g., associated with, transmitting data to, receiving data from) network device 100, the amount of network traffic (e.g., aggregate bandwidth) being used by the one or more client devices in communication with network device 100, or a combination thereof. The client load may correspond to the amount of network traffic (e.g., aggregate bandwidth) being used by the one or more client devices in communication with network device 100.

At block 510, method 500 may comprise selecting a first ranging interval. At block 515, method 515 may comprise selecting a second ranging interval, wherein the first ranging interval is shorter than the second ranging interval.

As used herein, a "ranging interval" (e.g., first ranging interval, second ranging interval) refers to a frequency of ranging measurements initiated by a network device (e.g., network device 100) and one or more other network devices (e.g., APs). That is, a ranging interval refers to a duration of time between successive ranging measurements initiated by a network device. A ranging interval may be measured in time units, wherein a time unit corresponds to 1.024 milliseconds.

The first ranging interval may correspond to a frequency of every $m^{th}$ scan during a beacon interval, and the second ranging interval may correspond to a frequency of every $n^{th}$ scan during a beacon interval, wherein m is an integer that is greater than n. The first ranging interval may correspond to an "aggressive scan" in which ranging occurs at a higher frequency (relative to the second ranging interval) without causing disruptions to (e.g., interference with) communications between network device 100 and one or more client devices (e.g., when beacons are transmitted by network device 100 to the one or more client devices). Conversely, the second ranging interval may correspond to a "default scan" in which ranging occurs at a lower frequency (relative to the first ranging interval) without causing disruptions to (e.g., interference with) communications between network device 100 and one or more client devices.

At block 520, method 500 may include initiating, during a beacon interval (e.g., first beacon interval), ranging measurements with the selected AP on a channel (e.g., first channel) at the selected ranging interval (the selected one of the first ranging interval and the second ranging interval) to generate a ranging result. Block 520 may include the same or similar steps are described above in relation to block 335 of method 300.

In this manner, example network device 100 provides ranging at a ranging interval that optimizes the available time within a beacon interval (e.g., during an off-channel dwell period), thereby reducing airtime overhead for performing ranging by network device 100 and avoiding disruptions to communications between network device 100 and one or more client devices (e.g., during an on-channel dwell period). For instance, network device 100 may determine whether a client load on network device 100 exceeds a load threshold (at block 505), and based on a determination that the client load does not exceed the load threshold, select a first ranging interval (at block 510) such that ranging occurs at a higher frequency without causing disruptions to (e.g., interference with) communications between network device 100 and one or more client devices, or conversely, based on a determination that the client load exceeds the load threshold, select a second ranging interval (at block 515) such that ranging occurs at a lower frequency without causing disruptions to (e.g., interference with) communications between network device 100 and one or more client devices. This allows network device 100 to initiate ranging measurements with a selected AP on a channel to generate a ranging result (at block 520) at a selected ranging interval that optimizes the available time that network device 100 does not communicate with one or more client devices (e.g., when network device 100 is not transmitting beacons to one or more client devices.)

Figure 6:
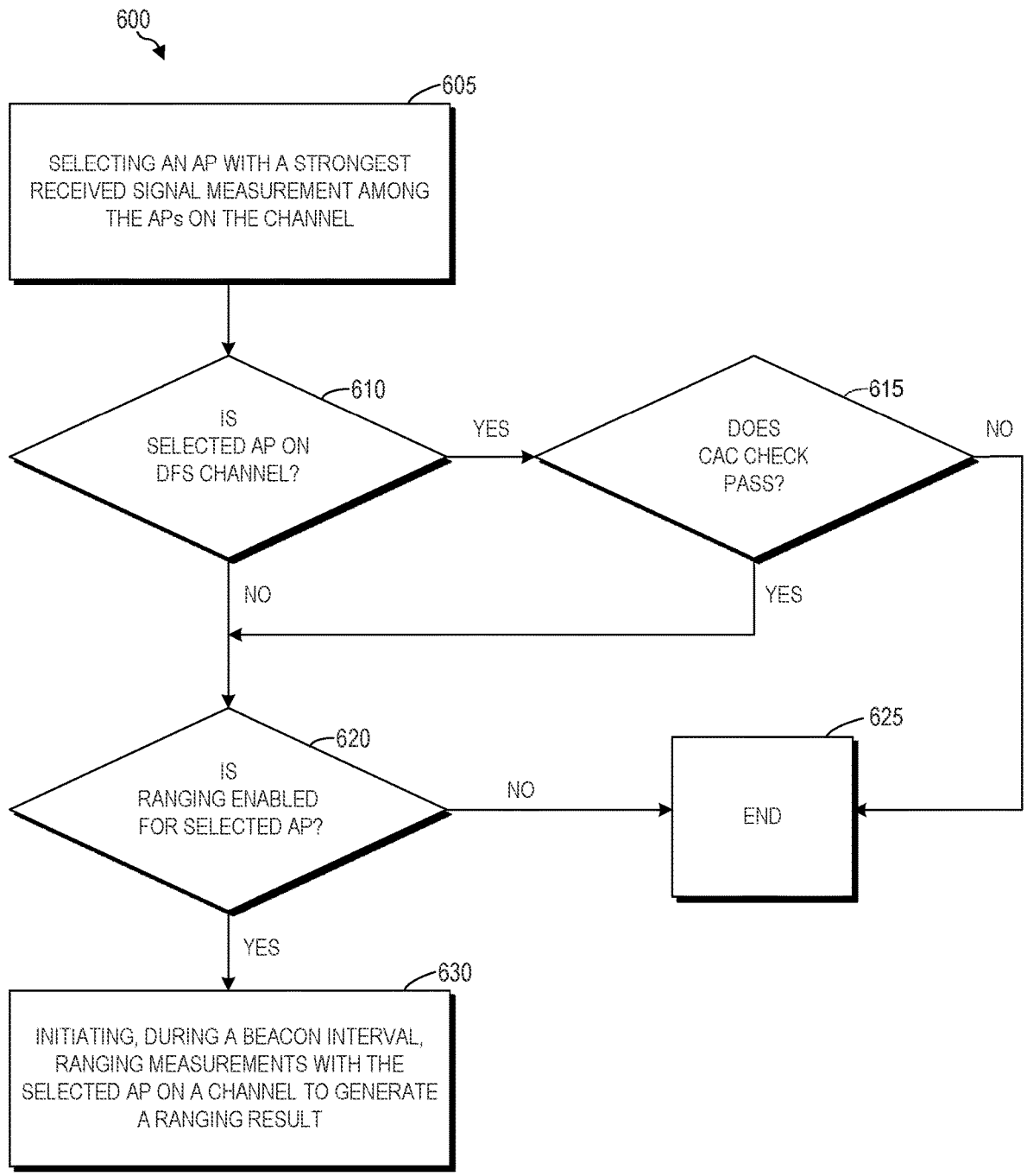
FIG. 6 is a flowchart of an example method for providing ranging between APs in a network during a beacon interval.

Referring to FIG. 6, a flowchart depicting a method 600 for ranging by a network device during a beacon interval is presented in some examples. Although the execution of method 600 is described below with reference to network device 100 of FIG. 1, any suitable network device for the execution of method 600 may be utilized. Additionally, the implementation of method 600 is not limited to such examples. While method blocks 605 to 630 are shown in method 600, method 600 may include other actions described herein. Additionally, although the blocks are shown in an order, blocks depicted in FIG. 6 may be performed in any suitable order and at any time. Moreover, one or more of blocks of method 600 may be performed in combination with one or more blocks of methods 400, 500, and 700. For instance, method 600 may include steps 610 to 625 for determining whether the selected AP is available for ranging (at block 420 of method 400.) Also, some of the blocks shown in method 600 may be omitted without departing from the spirit and scope of this disclosure.

At block 605, method 600 may include selecting an AP with a strongest received signal measurement among a plurality of APs on a channel (e.g., first channel). Block 605 may include the same or similar steps as described above in relation to block 415 of method 400.

At block 610, method 600 may include determining whether the channel is a dynamic frequency selection (DFS) channel. At block 610, if it is determined that the channel is a DFS channel, then method 600 proceeds to block 615. Conversely, at block 610, if it is determined that the channel is not a DFS channel, then method 600 proceeds to block 620.

As used herein, a "dynamic frequency selection channel" refers to a channel allocation scheme that is reserved for usages of the C band frequency band (e.g., 4 GHz to 8 GHz as designated by IEEE, 3.7 GHz to 4.2 GHz as designated by the U.S. Federal Communications Commission) for applications such as radar (e.g., military radar, satellite communications, weather radar, etc.) For instance, the DFS channel may correspond to the Unlicensed National Information Infrastructure 2C band (U-NII-2C) with a frequency range between 5.470 to 5.725 GHz. It will be understood that the DFS channel may correspond to a channel allocation scheme in any suitable designated frequency range.

At block 615, method 600 may comprise determining whether the channel satisfies a channel availability check (CAC). As used herein, a "channel availability check" refers to a determination process as to whether another device (e.g., radar device) in proximity to the network device is using a DFS channel. At block 615, if it is determined that the channel satisfies the CAC (e.g., if it is determined that there is no other device in communicative range of network device 100 that is using a DFS channel), then method 600 proceeds to block 620. Conversely, at block 615, if it is determined that the channel does not satisfy the CAC (e.g., if it is determined that another device in communicative range of network device 100 is using a DFS channel), then method 600 proceeds to block 625 to determine that the selected AP is not available for ranging.

At block 620, method 600 may comprise determining whether ranging is enabled for the selected AP. At block 620, if it is determined that ranging is enabled for the selected AP, then the selected AP is available for ranging, and method 600 proceeds to block 630. Conversely, at block 620, if it is determined that ranging is not enabled for the selected AP, then method 600 proceeds to block 625 to determine that the selected AP is not available for ranging.

At block 630, method 600 may include initiating, during a beacon interval (e.g., first beacon interval), ranging measurements with the selected AP on a channel (e.g., first channel) to generate a ranging result. Block 630 may include the same or similar steps as described above in relation to block 425 of method 400.

In this manner, example network device 100 provides ranging with a selected AP without causing disruptions to a DFS channel being used by other devices (e.g., radar devices) and provides ranging only when the selected AP has ranging enabled.

Figure 7:
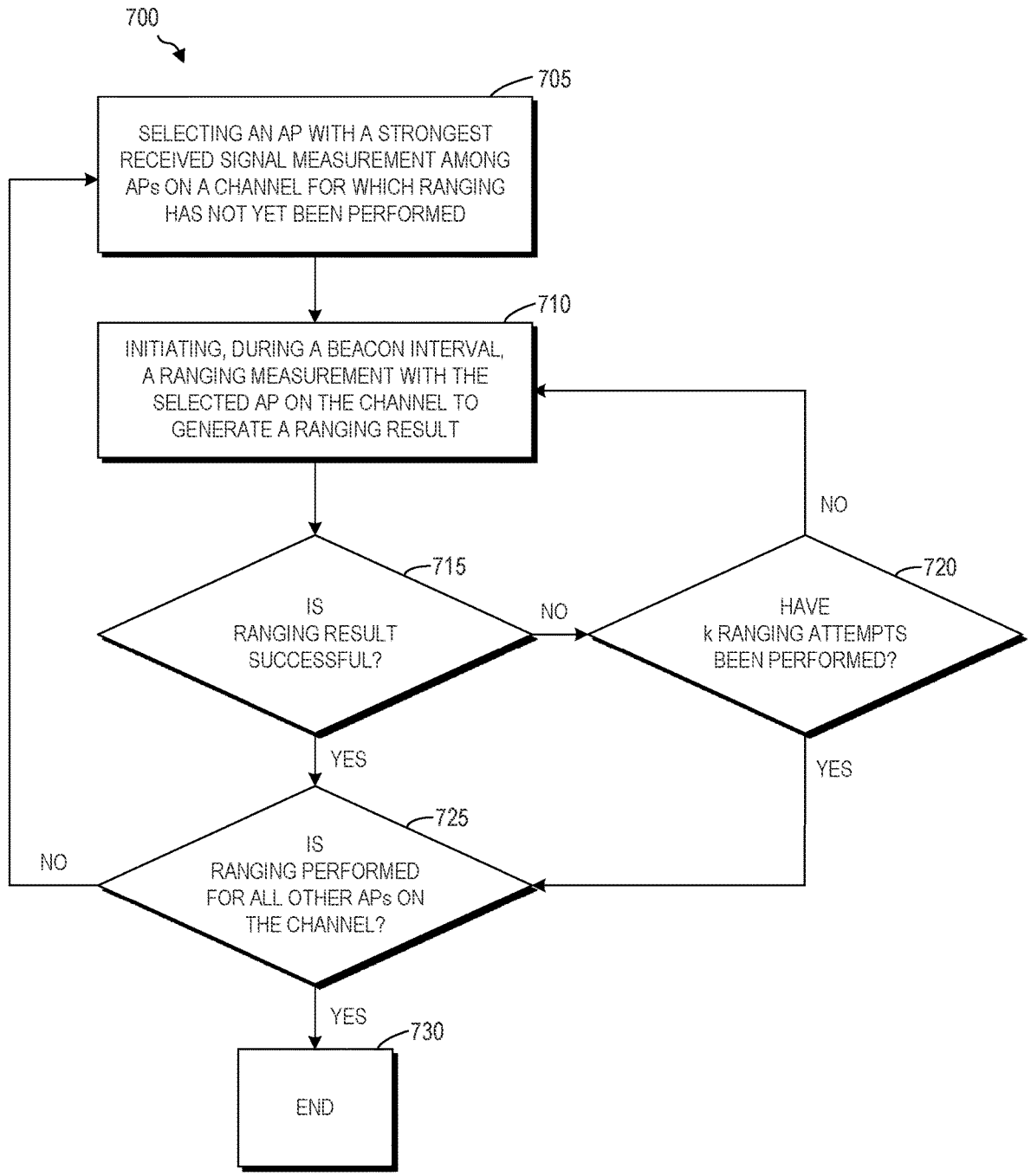
FIG. 7 is a flowchart of an example method for providing ranging between APs in a network during a beacon interval.

Referring to FIG. 7, a flowchart depicting a method 700 for ranging by a network device during a beacon interval is presented in some examples. Although the execution of method 700 is described below with reference to network device 100 of FIG. 1, any suitable network device for the execution of method 700 may be utilized. Additionally, the implementation of method 700 is not limited to such examples. While method blocks 705 to 730 are shown in method 700, method 700 may include other actions described herein. Additionally, although the blocks are shown in an order, blocks depicted in FIG. 7 may be performed in any suitable order and at any time. Moreover, one or more of blocks of method 700 may be performed in combination with one or more blocks of methods 400, 500, or 600. Also, some of the blocks shown in method 700 may be omitted without departing from the spirit and scope of this disclosure.

At block 705, method 700 may include selecting an AP (e.g., first AP) with a strongest received signal measurement among the plurality of APs on a channel (e.g., first channel) for which ranging has yet not been performed. Block 705 may include the same or similar steps as described above in relation to block 415 of method 400.

At block 710, method 700 may include initiating, during a beacon interval, ranging measurements with the selected AP on the channel to generate a ranging result. Block 710 may include the same or similar steps as described above in relation to block 425 of method 400.

At block 715, method 700 may include determining whether the ranging result generated by network device 100 is successful. At block 715, if it is determined the ranging result is not successful, then method 700 proceeds to block 720. Conversely, at block 715, if it is determined that the ranging result is successful, then method 700 proceeds to block 725.

Determining whether the ranging result generated by network device 100 is successful may include determining whether the ranging result satisfies an accuracy threshold. The accuracy threshold may be based on a deviation threshold (e.g., standard deviation) of the ranging result. It will be understood that the accuracy threshold for the ranging result may be determined based on any suitable deviation measurement.

At block 720, method 700 may include determining whether k ranging attempts have been performed between network device 100 and the selected AP. That is, at block 720, method 700 may include determining whether ranging measurements have been initiated by network device 100 and the selected AP on the channel to generate a ranging result (at block 710) for k number of times. It will be understood that k may be set to one, five, ten, or any suitable number of times. At block 720, if it is determined that k ranging attempts have not yet been performed between network device 100 and the selected AP (i.e., less than k ranging attempts have been performed between network device 100 and the selected AP), then method 700 returns to block 710. Conversely, at block 720, if it is determined that k ranging attempts have been performed between network device 100 and the selected AP, then method proceeds to block 725.

At block 725, method 700 may include determining whether ranging has been performed for all APs on the channel (i.e., all APs on the channel including the currently selected AP.) At block 725, if it is determined that ranging has not been performed for all APs on the channel, then method 700 returns to block 705 to select another AP (e.g., second AP) with a strongest received signal measurement among the plurality of APs on the channel for which ranging has not yet been performed. Conversely, at block 725, if it is determined that ranging has been performed for all APs on the channel, then method 700 proceeds to block 730, i.e., to end ranging between network device 100 and the plurality of APs on the channel.

In this manner, example network device 100 performs ranging with a plurality of APs on a channel in an order of strength of the received signal measurements of the plurality of APs, thereby increasing the likelihood of generating high quality ranging results and improving the reliability (e.g., accuracy) of resolving locations of the plurality of APs based on the ranging results.

System/Computing System

Figure 2:
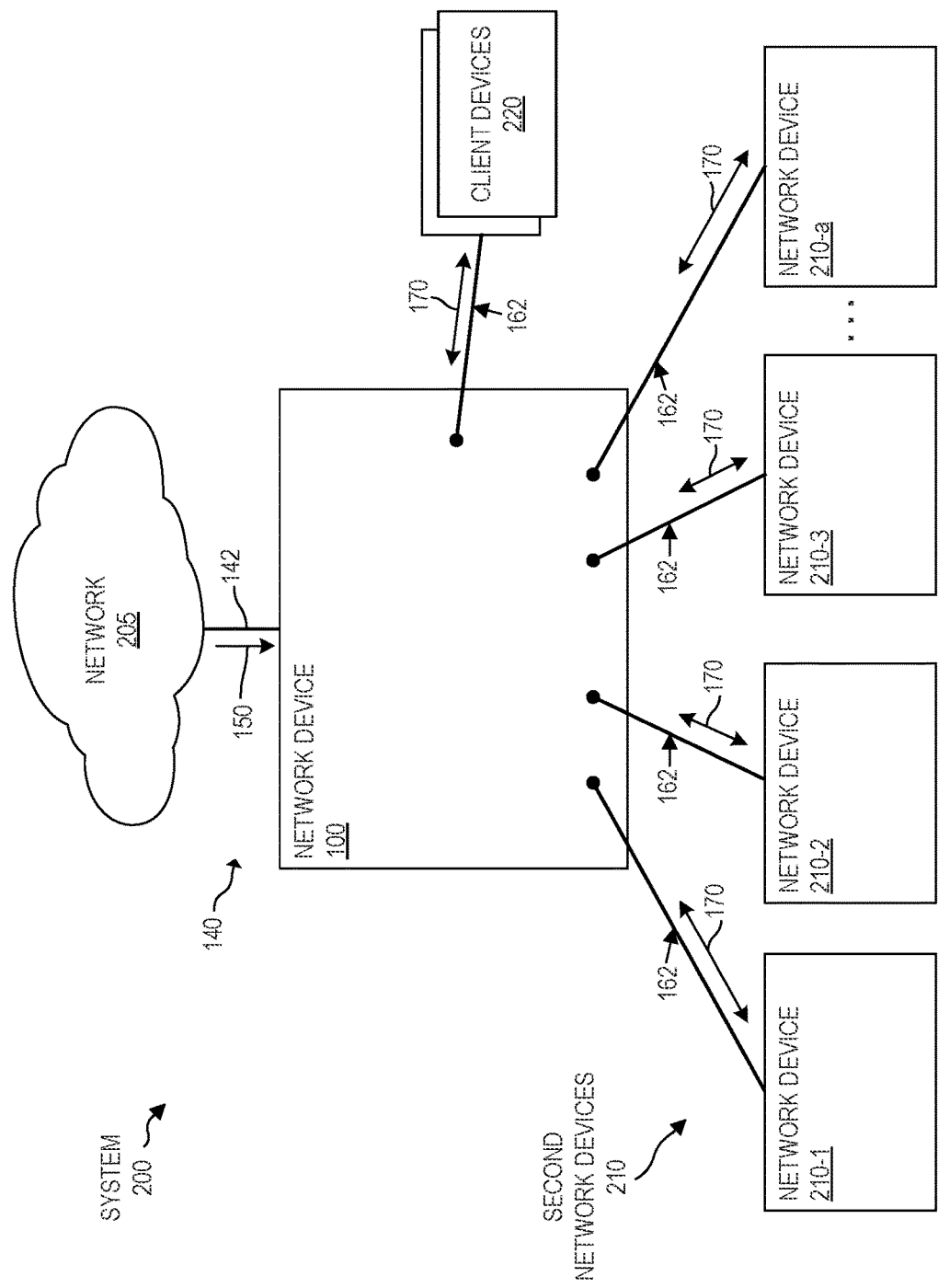
FIG. 2 shows a block diagram for an example system for providing ranging between APs in a network during a beacon interval.

FIG. 2 is a block diagram of an example system 200 including a network device for ranging during a beacon interval. System 200 includes a network device 100 (as described above in relation to FIG. 1) that is connected to a network 205. In addition, system 200 includes a plurality of second network devices 210 and a plurality of client devices 220 that are connected to network 205. Second network devices 210 include a plurality of network devices 210-1 to 210-a, wherein a is an integer and represents a total number of the second network devices 210. Although FIG. 2 illustrates that second network devices 210 includes four network devices (210-1, 210-2, 210-3, 210-a), it will be understood that system 200 can include, two, three, ten, or any suitable number of second network devices 210.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. In addition, network 205 may comprise one or more cellular networks using one or more mobile communications standards (e.g., 3G, 4G, 5G, etc.). It will be understood that system 200 may comprise any suitable type(s) of network(s) 205. Moreover, one or more computing devices (not shown) may be connected between network device 100 and network 205.

In the example of FIG. 2, each of the second network devices 210 includes at least one radio (not shown) to communicate with network device 100, with one or more client devices (e.g., client devices 220, other client devices), with one or more other network devices (e.g., one or more second network devices 210), with one or more computing devices, or a combination thereof. The radio(s) may generate a signal in one or more frequency bands, process a signal in one or more frequency bands, or a combination thereof. The radio(s) of second network devices 210 may operate at any suitable frequency band(s) and conform to any suitable type(s) of wireless communication standards, now known or later developed. For instance, one or more radios of second network devices 210 may operate at one or more channels in the 2.4 GHz band and/or 5 GHz band, in accordance with the IEEE 802.11ac and/or 802.11ax standards. Moreover, each of second network devices 210 may include one, two, or any other suitable number of radios.

In the example of FIG. 2, network device 100 may communicate with one or more client devices 220 (e.g., via links 162.) Each of the client devices 220 may include a communication device such as a laptop computer, a desktop computer, a mobile device, or other wireless devices, etc. Network device 100 may communicate with one or more client devices 220 via a radio.

In the example of FIG. 2, each of the second network devices 210 may be capable of ranging. That is, each network device (e.g., 210-1, 210-2, 210-3, . . . 210-a) of second network devices 210 may allow ranging measurements to be initiated with network device 100 on a channel to generate a ranging result. It will be understood that system 200 may include other network device(s) (not shown) which are not capable of ranging and/or which allow ranging measurements to be initiated with network device 100 on same or different channels as second network devices 210.

In the example of FIG. 2, network device 100 may be configured to receive network request(s) 150 via a network path(s) 140 to establish communication with one or more of second network devices 210 (as described above in relation to FIG. 1.) For instance, network device 100 may receive a signal from network 205 containing network request 150 (as describe above in relation to FIG. 1.)

In the example of FIG. 2, computing device 100 may be configured to send or receive communication signal(s) 170 via communication path(s) 160 to establish communication with one or more network devices 210 (as describe above in relation to FIG. 1.)

In the example of FIG. 2, second network devices 210 may engage in any network data transmission operations, including, but not limited to, switching, routing, bridging, or a combination thereof. In addition, one or more second network devices 210 may comprise a WAP. It will be understood that second network devices 210 may include any suitable type(s) of network device(s) made by any suitable manufacturer(s).

In the example of FIG. 2, network device 100 is configured to (e.g., encoded with non-transitory machine-readable instructions executable by at least one processing resource 110) to perform at least AP discovering instructions 122, AP selecting instructions 124, and ranging initiating instructions 126, as described above in relation to FIG. 1.

For example, network device 100 may be configured to transmit a plurality of beacons on a first channel with a beacon interval between each pair of the plurality of beacons. Specifically, network device 100 may transmit the plurality of beacons to each of client devices 220 on the first channel to establish communications (e.g., via links 162) with each of the client devices 220 on the first channel.

In addition, in such example, network device 100 may be configured to discover, during a first beacon interval, second network devices 210 on a second channel that are capable of ranging and a received signal measurement of each of the second network devices 210 on the second channel. Specifically, network device 100 may scan, during the first beacon interval, the second channel, and receive the plurality of beacons from each of second network devices 210 on the second channel, wherein the plurality of beacons indicate that the plurality of APs are capable of ranging Moreover, in such example, network device 100 may be configured to select an AP with a strongest received signal measurement among second network devices 210 on the second channel. For instance, network device 100 may receive a received signal measurement from each of the second network devices 210 on the second channel, and may then select network device 210-2 based on a determination that network device 210-2 has a strongest received signal measurement among network devices (210-1, 210-2, 210-3, . . . 210-a) of second network devices 210. Further, network device 100 may sort a list of basic service set identifiers (BSSIDs) of the second network devices 210 on the second channel based on the received signal measurement of each of the second network devices 210 on the second channel, and then select the BSSID of network device 210-2, since it is the first listed BSSID among the sorted list of BSSIDs (and corresponds to the network device with the highest received signal measurement.)

Furthermore, in such example, network device 100 may determine whether the selected network device 210-2 is available for ranging. Based on (e.g., in response to) a determination that the selected network device 210-2 is available for ranging, network device 100 may initiate, during a second beacon interval, ranging measurements with the selected network device 210-2 on the second channel to generate a ranging result. Moreover, network device 100 may configure a channel bandwidth in the second channel for the ranging measurements, configure an antenna chain between network device 100 and network device 210-2

(e.g., by selecting an antenna of network device 100 and an antenna of network device 210-2 to perform the ranging measurements), and configure a transmission EIRP for network device 100 to perform the ranging measurements.

Further, in such example, a computing device (not shown) in network 205 may resolve locations of second network devices 210 based on the ranging result. Specifically, network device 100 may transmit the ranging result to the computing device, wherein the computing device resolves the locations of the plurality of APs based on the ranging result.

In this manner, example system 200 provides ranging during a beacon interval by network device 100, thereby reducing airtime overhead for performing ranging by network device 100 and minimizing disruptions to communications between network device 100 and client devices 220 when there are changes to the network topology. For instance, network device 100 may discover, during a beacon interval (e.g., first beacon interval), second network devices 220 on a channel (e.g., second channel) in network 205 that are capable of ranging and a received signal measurement of each of the second network devices 220, thereby enabling network device 100 to discover second network devices 220 during a time (e.g., during the first beacon interval) when network device 100 does not communicate with client devices 220 (e.g., when network device 100 does not transmit a plurality of beacons to client devices 220 on a first channel.) Moreover, network device 100 may initiate, during a beacon interval (e.g., second beacon interval), ranging measurements with a selected network device 210-2 having a strongest received signal measurement among second network devices 210 to generate a ranging result, thereby enabling ranging between network device 100 and the selected network device 210-2 during a time (e.g., during the second beacon interval) when network device 100 does not communicate with client devices 220. Moreover, in such examples, network device 100 initiates ranging with the selected network device 210-2 having the strongest received signal measurement among second network devices 210, thereby increasing the likelihood of generating a high quality ranging result and improving the reliability (e.g., accuracy) of resolving locations of second network devices 210 based on the ranging result.

In addition, in the example described above, network device 100 may determine whether the ranging result generated by network device 100 (after initiating the ranging measurements with the selected network device 210-2 on the first channel) is successful. In such example, based on a determination that the ranging result is successful, network device 100 may select another network device 210-3 on the first channel with a strongest received signal measurement among second network devices 210 for which ranging has not yet been performed (note that network device 210-2 would be excluded from being selected since ranging was already performed with network device 210-2). Then, in such example, network device 100 may perform ranging (in the manner described above) between network device 100 and the selected network device 210-3. Moreover, network device 100 may subsequently select each of the remaining network devices of second network devices 210 (for which ranging has not yet been performed) in the order of strength of the received signal measurement, and perform ranging between network device 100 and the selected network device until ranging has been performed between network device 100 and each of the second network devices 210 (or alternatively, until at least k number of ranging attempts have been performed between network device 100 and each of the second network devices 210.)

In this manner, example system 200 provides ranging by a network device 100 with each of second network devices 210 on a channel (e.g., first channel), in an order of strength of the received signal measurements of second network devices 210 on the channel, thereby increasing the likelihood of generating high quality ranging results and improving the reliability (e.g., accuracy) of resolving locations of second network devices 210 based on the ranging results.

Figure 3:
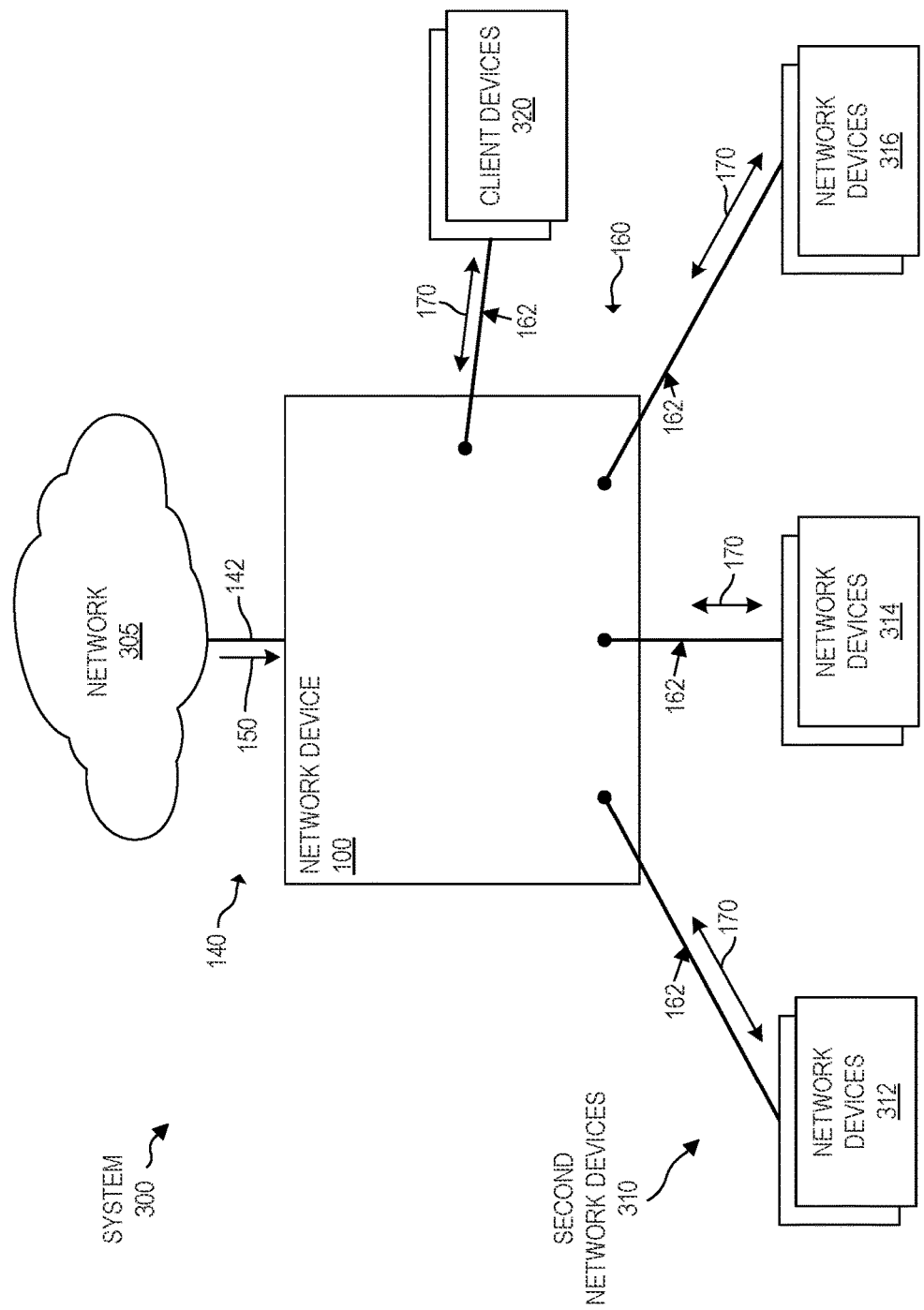
FIG. 3 shows a block diagram for an example system for providing ranging between APs in a network during a beacon interval.

FIG. 3 is a block diagram of an example system 300 including a network device for ranging during a beacon interval. System 300 includes network device 100 (as described above in relation to FIG. 1) that is connected to a network 305. In addition, system 300 comprises a plurality of second network devices 310 and a plurality of client devices 320 that are connected to network 305. Second network devices 310 include a first subset of network devices 312, a second subset of network devices 314, and a third subset of network devices 316, wherein each subset of second network devices 310 are configured to communicate on a different channel (e.g., first channel, second channel, third channel) of network 305. Although FIG. 3 illustrates second network devices 310 having three subsets of network devices (subsets 312, 314, and 316), it will be understood that second network devices 310 may include one, two, three, ten, or any suitable number of subsets of network devices that are connected to network 305.

In the example of FIG. 3, network 305 may include any suitable type(s) of networks, as described above in relation to network 205 of system 200. Moreover, one or more computing devices (not shown) may be connected between network device 100 and network 305 (e.g., via links 150.)

In the example of FIG. 3, each of the second network devices 310 includes at least one radio (not shown) to communicate with network device 100 (e.g., via links 162), with one or more client devices (e.g., client devices 320, other client devices), with one or more other network devices (e.g., with one or more second network devices 310), with one or more computing devices, or a combination thereof, and each of the second network devices 310 may include one, two, or any other suitable number of radios. Each radio of each of the second network devices 310 may operate at any suitable frequency band(s) and conform to any suitable type(s) of wireless communication standards.

In the example of FIG. 2, network 305 may include a plurality of client devices 320 in network 305, wherein network device 100 may communicate with one or more of client devices 320 (e.g., via links 162.) Each of client devices 320 may include any suitable type(s) of communication device(s). Network device 100 may communicate with one or more client devices 320 via a radio.

In the example of FIG. 3, each of the second network devices 310 may be capable of ranging. That is, each of the second network devices 310 may allow ranging measurements to be initiated with network device 100 on a channel to generate a ranging result. It will be understood that system 300 may include other network device(s) (not shown) which are not capable of ranging and/or which allow ranging measurements to be initiated with network device 100 on the same or different channels as one or more of second network devices 310.

In the example of FIG. 3, network device 100 may be configured to receive network request(s) 150 via a network path(s) 140 of network 305 to establish communication with one or more of second network devices 310, in a similar manner as described above in relation to FIGS. 1 and 2.

In the example of FIG. 3, network device 100 may be configured to send or receive communication signal(s) 170 via communication path(s) 160 to establish communication with one or more second network devices 310, in a similar manner as described above in relation to FIGS. 1 and 2.

In the example of FIG. 3, second network devices 310 may engage in any network data transmission operations, including, but not limited to, switching, routing, bridging, or a combination thereof. In addition, one or more second network devices 310 may comprise a WAP. It will be understood that second network devices 310 may include any suitable type(s) of network device(s) made by any suitable manufacturer(s).

In the example of FIG. 3, network device 100 is configured to (e.g., encoded with non-transitory machine-readable instructions executable by at least one processing resource 110) to perform at least AP discovering instructions 122, AP selecting instructions 124, and ranging initiating instructions 126, in a similar manner as described above in relation to FIGS. 1 and 2.

For example, network device 100 may be configured to transmit a plurality of beacons with a beacon interval between each pair of the plurality of beacons. Specifically, network device 100 may transmit the plurality of beacons to each of the client devices 320 on a first channel to establish communications (e.g., via links 162) with each of the client devices 320 on the first channel.

Further, in such example, network device 100 may be configured to discover, during a first beacon interval, a first subset of network devices 312 on a second channel that are capable of ranging and a received signal measurement of each of the first subset of network devices 312 on the second channel. In addition, network device 100 may be configured to discover, during a second beacon interval, a second subset of network devices 314 on a third channel that are capable of ranging and a received signal measurement of each of the second subset of network devices 314 on the third channel. Furthermore, network device 100 may be configured to discover, during a third beacon interval, a third subset of network devices 316 on a fourth channel that are capable of ranging and a received signal measurement of each of the third subset of network devices 316 on the fourth channel.

Further, in such example, network device 100 may be configured to select an AP with a strongest received signal measurement among the first subset of network devices 312 on the second channel. In addition, network device 100 may be configured to select an AP with a strongest received signal measurement among the second subset of network devices 314 on the third channel. Furthermore, network device 100 may be configured to select an AP with a strongest received signal measurement among the third subset of network devices 316 on the fourth channel.

Further, in such example, network device 100 may be configured to determine whether the selected network device of the first subset of network devices 312 is available for ranging. Based on (e.g., in response to) a determination that the selected network device of the first subset of network devices 312 is available for ranging, network device 100 may initiate, during a fourth beacon interval, ranging measurements with the selected network device of the first subset of network devices 312 on the second channel to generate a first ranging result.

Further, in such example, network device 100 may be configured to determine whether the selected network device of the second subset of network devices 314 is available for ranging. Based on (e.g., in response to) a determination that the selected network device of the second subset of network devices 314 is available for ranging, network device 100 may initiate, during a a fifth beacon interval, ranging measurements with the selected network device of the second subset of network devices 314 on the third channel to generate a second ranging result.

Further, in such example, network device 100 may be configured to determine whether the selected network device of the third subset of network devices 316 is available for ranging. Based on (e.g., in response to) a determination that the selected network device of the third subset of network devices 316 is available for ranging, network device 100 may initiate, during a sixth beacon interval, ranging measurements with the selected network device of the third subset of network devices 316 on the fourth channel to generate a third ranging result.

Further, in such example, based on the first, second, and third ranging results, a computing device (not shown) in network 305 may resolve locations of second network devices 310. Specifically, network device 100 may transmit the first, second, and third ranging results to the computing device, wherein the computing device resolves the locations of second network devices 310 based on the first, second, and third ranging results. Alternatively, based on the first, second, and third ranging results, network device 100 may resolve locations of second network devices 310.

In this manner, example system 300 provides ranging, by network device 100 during beacon intervals, with second network devices 310 on a plurality of channels (e.g., second channel, third channel, fourth channel), thereby reducing airtime overhead for performing ranging by network device 100 on the plurality of channels and minimizing disruptions to communications between network device 100 and client devices 220 when there are changes to the network topology. Moreover, in such examples, network device 100 initiates ranging with the selected network device having the strongest received signal measurement among second network devices 310 in each of a plurality of channels, thereby increasing the likelihood of generating a high quality ranging result and improving the reliability (e.g., accuracy) of resolving locations of second network devices 310 on the plurality of channels based on the ranging result.

In addition, in the example described above, network device 100 may determine whether the first ranging result generated by network device 100 (after initiating the ranging measurements with the selected network device of the first subset of network devices 312 on the second channel) is successful. In such example, based on a determination that the ranging result is successful, network device 100 may select another network device of the first subset of network devices 312 on the second channel with a strongest received signal measurement among the first subset of network devices 312, for which ranging has not yet been performed. Then, in such example, network device 100 may perform ranging between network device 100 and the selected network device. Moreover, network device 100 may subsequently select each of the remaining network devices of the first subset of network devices 312 (for which ranging has not yet been performed) in the order of strength of the received signal measurement, and perform ranging between network device 100 and the selected network device until ranging has been performed between network device 100 and each of the first subset of network devices 312 (or alternatively, until at least k number of ranging attempts have been performed between network device 100 and each of the first subset of network devices 312.)

Similarly, network device 100 may subsequently select each of the remaining network devices of the second subset of network devices 314 (for which ranging has not yet been performed) in the order of strength of the received signal measurement, and perform ranging between network device 100 and the selected network device until ranging has been performed between network device 100 and each of the second subset of network devices 314 (or alternatively, until at least k number of ranging attempts have been performed between network device 100 and each of the second subset of network devices 314.) Similarly, network device 100 may subsequently select each of the remaining network devices of the third subset of network devices 316 (for which ranging has not yet been performed) in the order of strength of the received signal measurement, and perform ranging between network device 100 and the selected network device until ranging has been performed between network device 100 and each of the third subset of network devices 316 (or alternatively, until at least k number of ranging attempts have been performed between network device 100 and each of the third subset of network devices 316.)

In this manner, example system 300 provides ranging by a network device 100 with each network device on each of a plurality of channels (e.g., second channel, third channel, fourth channel), in an order of strength of the received signal measurements of each network device on each channel, thereby increasing the likelihood of generating high quality ranging results on the plurality of channels and improving the reliability (e.g., accuracy) of resolving locations of second network devices 310 based on the ranging results on the plurality of channels.

Figure 8:
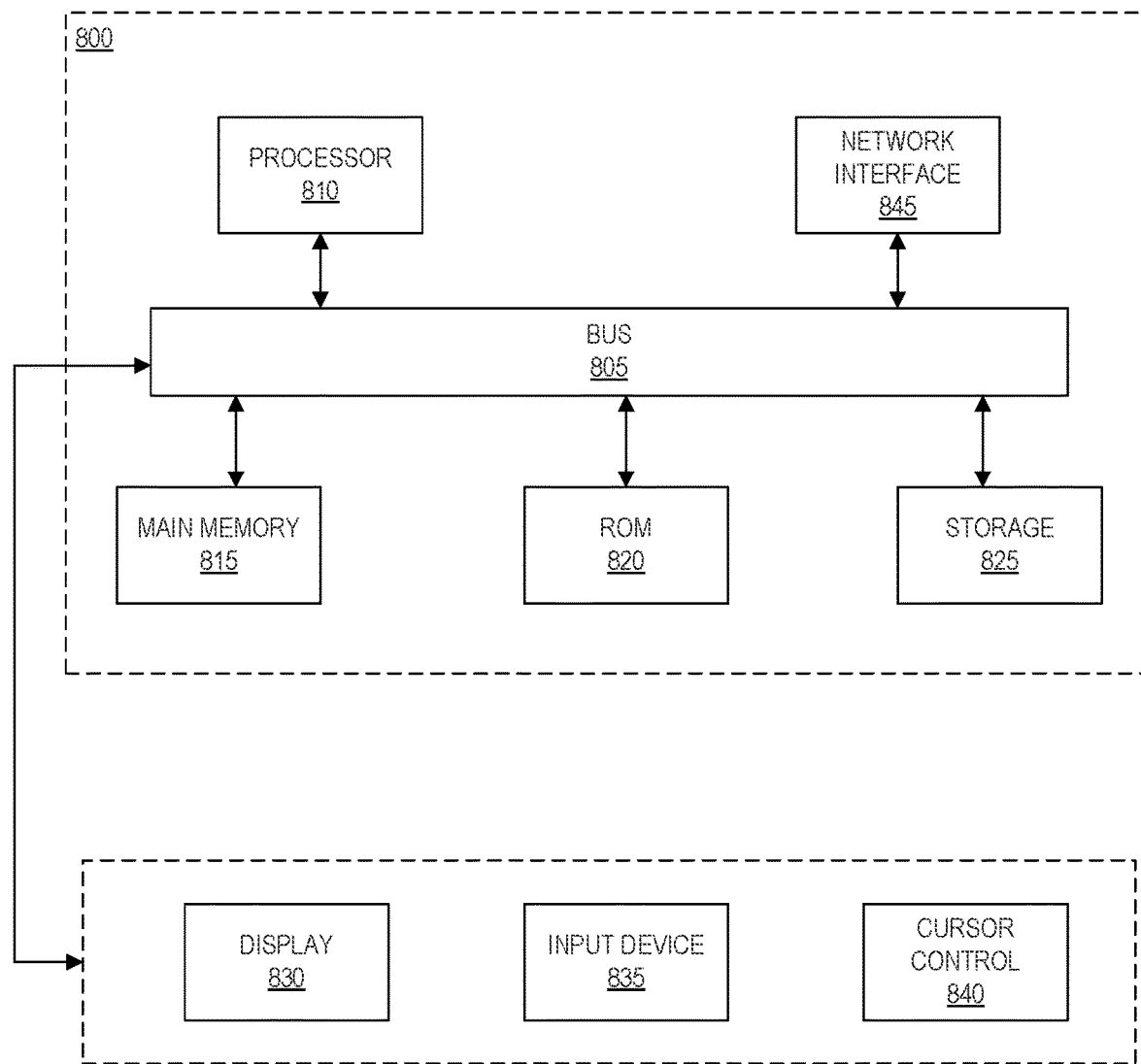
FIG. 8 is a block diagram of an example computer system in which various embodiments described herein may be implemented for providing ranging between APs in a network during a beacon interval.

FIG. 8 is a block diagram of an example computer system 800 in which various embodiments described herein may be implemented for ranging during a beacon interval.

Computer system 800 includes bus 805 or other communication mechanism for communicating information, at least one hardware processor 810 coupled with bus 805 for processing information. At least one hardware processor 810 may be, for example, at least one general purpose microprocessor.

Computer system 800 also includes main memory 815, such as random access memory (RAM), cache, other dynamic storage devices, or the like, or a combination thereof, coupled to bus 805 for storing information and one or more instructions to be executed by at least one processor 810. Main memory 815 also may be used for storing temporary variables or other intermediate information during execution of one or more instructions to be executed by at least one processor 810. In some examples, the one or more instructions comprise one or more AP discovering instructions 122, AP selecting instructions 124, and ranging initiating instructions 126, as described above in relation FIGS. 1-7. Such one or more instructions, when stored on storage media accessible to at least one processor 810, render computer system 800 into a special-purpose machine that is customized to perform the operations specified in the one or more instructions.

Computer system 800 may further include read only memory (ROM) 820 or other static storage device coupled to bus 805 for storing one or more instructions to be executed by at least one processor 810. In some examples, the one or more AP discovering instructions 122, AP selecting instructions 124, and ranging initiating instructions 126, as described above in relation to FIGS. 1-7 above. Such one or more instructions, when stored on storage media accessible to at least one processor 810, render computer system 800 into a special-purpose machine that is customized to perform the operations specified in the one or more instructions.

Computer system 800 may further include information and one or more instructions for at least one processor 810. At least one storage device 825, such as a magnetic disk, optical disk, or USB thumb drive (Flash drive), or the like, or a combination thereof, may be provided and coupled to bus 805 for storing information and one or more instructions. In some examples, the one or more instructions comprise one or more AP discovering instructions 122, AP selecting instructions 124, and ranging initiating instructions 126, as described above in relation to FIGS. 1-7.

Computer system 800 may further include display 830 coupled to bus 805 for displaying a graphical output to a user. The computer system 800 may further include input device 835, such as a keyboard, camera, microphone, or the like, or a combination thereof, coupled to bus 805 for providing an input from a user. Computer system 800 may further include cursor control 840, such as a mouse, pointer, stylus, or the like, or a combination thereof, coupled to bus 805 for providing an input from a user.

Computer system 800 may further includes at least one network interface 845, such as a network interface controller (NIC), network adapter, or the like, or a combination thereof, coupled to bus 805 for connecting computer system 800 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 based on (e.g., in response to) at least one processor 810 executing one or more sequences of one or more instructions contained in main memory 815. Such one or more instructions may be read into main memory 815 from another storage medium, such as at least one storage device 825. Execution of the sequences of one or more instructions contained in main memory 815 causes at least one processor 810 to perform the process steps described herein. In alternative embodiments, hard-wired circuitry may be used in place of or in combination with software instructions.

What is claimed is:

1. A method, comprising:
discovering, by a user device during a first beacon interval, a plurality of access points (APs) on a first channel that are capable of ranging and a received signal measurement of each of the plurality of APs on the first channel;
determining, by the user device, a set of APs from the plurality of APs on the first channel that have yet to perform ranging;
selecting, by the user device, an AP with a strongest received signal measurement among the set of APs on the first channel;
determining, by the user device, whether the selected AP is available for ranging;
based on a determination that the selected AP is available for ranging, initiating, by the user device during a second beacon interval, ranging measurements with the selected AP on the first channel to generate a ranging result;
based on the ranging result, determining, by the user device, locations of the plurality of APs on the first channel; and
generating, by the user device, an AP map of the plurality of APs on the first channel based on the locations of the plurality of APs on the first channel.

2. The method of claim 1, further comprising:
transmitting, by the user device, a plurality of beacons on a second channel with a beacon interval between each pair of the plurality of beacons, wherein the first beacon interval is between a first pair of the beacons and the second beacon interval is between a second pair of the beacons.

3. The method of claim 2, wherein the first channel is different from the second channel.

4. The method of claim 1, wherein the received signal measurement of each of the plurality of APs on the first channel comprises a received signal strength indicator (RSSI), a signal to noise ratio (SNR), or a combination thereof.

5. The method of claim 1, wherein discovering the plurality of APs on the first channel comprises:
scanning, by the user device during the first beacon interval, the first channel; and
receiving, by the user device on the first channel, a plurality of beacons from the plurality of APs on the first channel, wherein the plurality of beacons indicate that the plurality of APs on the first channel are capable of ranging.

6. The method of claim 5, wherein the plurality of beacons indicate the received signal measurements of the plurality of APs on the first channel.

7. The method of claim 1, wherein selecting the AP with the strongest received signal measurement comprises:
sorting, by the user device, a list of basic service set identifiers (BSSIDs) of the plurality of APs on the first channel based on the received signal measurement of each of the plurality of APs on the first channel; and
selecting, by the user device, the BSSID of the AP with the strongest received signal measurement.

8. The method of claim 1, further comprising:
determining, by the user device, whether a client load on the user device exceeds a load threshold;
based on a determination that the client load does not exceed the load threshold, selecting, by the user device, a first ranging interval; and
based on a determination that the client load exceeds the load threshold, selecting, by the user device, a second ranging interval, wherein the first ranging interval is shorter than the second ranging interval;
wherein the ranging measurements with the selected AP on the first channel are initiated at the selected one of the first ranging interval and the second ranging interval.

9. The method of claim 1, wherein determining whether the selected AP is available for ranging comprises:
determining, by the user device, whether the first channel is a dynamic frequency selection (DFS) channel;
based on a determination that the first channel is a DFS channel, determining, by the user device, whether the first channel satisfies a channel availability check (CAC);
based on a determination that the first channel satisfies a CAC, determining, by the user device, that the selected AP is available for ranging; and
based on a determination that the first channel does not satisfy the CAC, determining, by the user device, that the selected AP is not available for ranging.

10. The method of claim 1, wherein determining whether the selected AP is available for ranging comprises:
determining, by the user device, whether ranging is enabled for the first channel;
based on a determination that ranging is enabled for the first channel, determining, by the user device, that the selected AP is available for ranging; and
based on a determination that ranging is disabled for the first channel, determining, by the user device, that the selected AP is not available for ranging.

11. The method of claim 1, wherein the ranging result comprises a plurality of distances of the plurality of APs on the first channel according to a position of the selected AP, and further comprising:
determining, by the user device, whether the ranging result satisfies an accuracy threshold; and
based on a determination that the ranging result does not satisfy the accuracy threshold, initiating, by the user device, second ranging measurements with the selected AP on the first channel to generate a second ranging result;
wherein determining the locations of the plurality of APs on the first channel is based on the second ranging result.

12. The method of claim 1, further comprising:
selecting, by the user device, a second AP with a strongest received measurement among the set of APs for which ranging has not yet been performed;
initiating, by the user device, second ranging measurements with the selected second AP on the first channel to generate a second ranging result;
based on the second ranging result, determining, by the user device, the locations of the plurality of APs on the first channel; and
updating, by the user device, the AP map of the plurality of APs on the first channel based on the locations of the plurality of APs on the first channel.

13. The method of claim 1, further comprising:
discovering, by the user device during a third beacon interval, a second plurality of access points (APs) on a second channel that are capable of ranging and a received signal measurement of each of the second plurality of APs on the second channel;

determining, by the user device, a second set of APs from the second plurality of APs on the second channel that have yet to perform ranging;

selecting, by the user device, a second AP with a strongest received signal measurement among the second set of APs on the second channel;

determining, by the user device, whether the selected second AP is available for ranging; and based on a determination that the selected second AP is available for ranging, initiating, by the user device during a fourth beacon interval, ranging measurements with the selected second AP on the second channel to generate a second ranging result comprising a second plurality of distances of the second plurality of APs on the second channel according to a second position of the selected second AP;

based on the second ranging result, determining, by the user device, second locations of the second plurality of APs on the second channel; and generating, by the user device, a second AP map of the second plurality of APs on the second channel based on the second locations of the second plurality of APs on the second channel.

14. A user device, comprising:

a processing resource; and a non-transitory machine-readable storage medium comprising instructions executable by the processing resource to:

discover, during a first beacon interval, a plurality of access points (APs) on a first channel that are capable of ranging and a received signal measurement of each of the plurality of APs on the first channel;

determine a set of APs from the plurality of APs on the first channel that have yet to perform ranging;

select an AP with a strongest received signal measurement among the set of APs on the first channel for which ranging has not yet been performed;

determine whether the selected AP is available for ranging;

based on a determination that the selected AP is available for ranging, initiate, during a second beacon interval, ranging measurements with the selected AP on the first channel to generate a ranging result;

based on the ranging result, determine locations of the plurality of APs on the first channel; and generate an AP map of the plurality of APs on the first channel based on the locations of the plurality of APs on the first channel.

15. The user device of claim 14, wherein the instructions further cause the processing resource to:

determine whether a client load on the user device exceeds a load threshold;

based on a determination that the client load does not exceed the load threshold, select a first ranging interval; and based on a determination that the client load exceeds the load threshold, select a second ranging interval, wherein the first ranging interval is shorter than the second ranging interval;

wherein the ranging measurements with the selected AP on the first channel are initiated at the selected one of the first ranging interval and the second ranging interval.

16. The user device of claim 14, wherein the ranging result comprises a plurality of distances of the plurality of APs on the first channel according to a position of the selected AP, and the instructions further cause the processing resource to:

determine whether the ranging result satisfies an accuracy threshold;

based on a determination that the ranging result does not satisfy the accuracy threshold, initiate second ranging measurements with the selected AP on the first channel to generate a second ranging result;

based on the second ranging result, determine second locations of the plurality of APs on the first channel; and update the AP map of the plurality of APs on the first channel based on the second locations of the plurality of APs on the first channel.

17. The user device of claim 14, wherein the instructions further cause the processing resource to:

select a second AP with a strongest received measurement among the set of APs for which ranging has not yet been performed;

initiate second ranging measurements with the selected second AP on the first channel to generate a second ranging result;

based on the second ranging result, determine second locations of the plurality of APs on the first channel; and update the AP map of the plurality of APs on the first channel based on the second locations of the plurality of APs on the first channel.

18. A non-transitory machine-readable storage medium comprising instructions executable by at least one processing resource to:

discover, by a user device during a first beacon interval, a plurality of access points (APs) on a first channel that are capable of ranging and a received signal measurement of each of the plurality of APs on the first channel;

determine, by the user device, a set of APs from the plurality of APs on the first channel that have yet to perform ranging;

select, by the user device, an AP with a strongest received signal measurement among the set of APs on the first channel for which ranging has not yet been performed;

determine, by the user device, whether the selected AP is available for ranging;

based on a determination that the selected AP is available for ranging, initiate, by the user device during a second beacon interval, ranging measurements with the selected AP to generate a ranging result;

based on the ranging result, determine, by the user device, locations of the plurality of APs on the first channel; and generate, by the user device, an AP map of the plurality of APs on the first channel based on the locations of the plurality of APs on the first channel.

19. The non-transitory machine-readable storage medium of claim 18, wherein the instructions comprise instructions to:

determine, by the user device, whether a client load on the user device exceeds a load threshold;

based on a determination that the client load does not exceed the load threshold, select, by the user device, a first ranging interval; and based on a determination that the client load exceeds the load threshold, select, by the user device, a second ranging interval, wherein the first ranging interval is shorter than the second ranging interval;

wherein the ranging measurements with the selected AP on the first channel are initiated at the selected one of the first ranging interval and the second ranging interval.

20. The method of claim 1, wherein the ranging comprises Fine Timing Measurement (FTM).

\* \* \* \* \*